(12) United States Patent
Reddy et al.

(10) Patent No.: US 9,975,083 B2
(45) Date of Patent: May 22, 2018

(54) SYSTEMS AND METHODS FOR MULTI-CELLED GAS PROCESSING

(71) Applicant: Fluor Technologies Corporation, Sugar Land, TX (US)

(72) Inventors: Satish Reddy, Laguna Beach, CA (US); Joseph Yonkoski, Irvine, CA (US)

(73) Assignee: Fluor Technologies Corporation, Sugar Land, TX (US)

( * ) Notice: Subject to any disclaimer, the term of this patent is extended or adjusted under 35 U.S.C. 154(b) by 73 days.

(21) Appl. No.: 15/132,667

(22) Filed: Apr. 19, 2016

(65) Prior Publication Data

US 2016/0228812 A1   Aug. 11, 2016

Related U.S. Application Data

(62) Division of application No. 13/887,069, filed on May 3, 2013, now Pat. No. 9,333,456.

(51) Int. Cl.
| | |
|---|---|
| *B01D 47/14* | (2006.01) |
| *B01F 3/04* | (2006.01) |
| *B01D 53/18* | (2006.01) |
| *B01D 53/14* | (2006.01) |

(52) U.S. Cl.
CPC ........... *B01D 53/185* (2013.01); *B01D 47/14* (2013.01); *B01D 53/1475* (2013.01); *B01D 53/18* (2013.01); *B01F 3/04078* (2013.01); *B01F 3/04085* (2013.01); *B01F 3/04468* (2013.01); *B01D 2257/302* (2013.01); *B01D 2257/504* (2013.01); *B01D 2258/0283* (2013.01)

(58) Field of Classification Search
CPC ..... B01D 53/18; B01D 47/14; B01F 3/04078; B01F 3/04085; B01F 3/04468

USPC ...... 95/236; 261/115, 116; 96/290, 296, 297
See application file for complete search history.

(56) References Cited

U.S. PATENT DOCUMENTS

| | | | |
|---|---|---|---|
| 3,097,917 | A | 7/1963 | Dotts, Jr. et al. |
| 4,063,899 | A | 12/1977 | Cheron et al. |
| 4,263,021 | A | 4/1981 | Downs et al. |
| 9,333,456 | B2 | 5/2016 | Reddy et al. |
| 2003/0019358 | A1 | 1/2003 | Slaymaker |
| 2010/0084283 | A1 | 4/2010 | Gomez |
| 2011/0219777 | A1 | 9/2011 | Wijmans et al. |
| 2011/0219778 | A1 | 9/2011 | Wijmans et al. |

(Continued)

FOREIGN PATENT DOCUMENTS

| | | |
|---|---|---|
| AU | 2013388102 B2 | 7/2016 |
| CN | 101062462 A | 10/2007 |

(Continued)

OTHER PUBLICATIONS

U.S. Appl. No. 13/887,069, Notice of Allowance, dated Jan. 11, 2016, 7 pages.

(Continued)

*Primary Examiner* — Robert A Hopkins
(74) *Attorney, Agent, or Firm* — Conley Rose, P.C.

(57) ABSTRACT

Systems and methods for gas processing are described that utilize two or more cells that are fluidly coupled to one another by a common liquid space. Via the common liquid space, each of the cells can be coupled to a fluid outlet. The cells can each include an absorber and/or other gas processing equipment. A feed gas can be separately fed to each of the cells for processing. The cells can be independently operable, such that not all of the cells must be operated simultaneously.

20 Claims, 3 Drawing Sheets

(56) References Cited

U.S. PATENT DOCUMENTS

| | | |
|---|---|---|
| 2011/0296988 A1 | 12/2011 | Buhrman et al. |
| 2013/0069254 A1 | 3/2013 | Zaman |
| 2014/0326140 A1 | 11/2014 | Reddy et al. |

FOREIGN PATENT DOCUMENTS

| | | |
|---|---|---|
| CN | 101827641 A | 9/2010 |
| CN | 101879403 A | 11/2010 |
| EP | 2520352 A1 | 7/2012 |
| EP | 2520352 A1 | 11/2012 |
| GB | 1597479 | 9/1981 |
| JP | 62280491 A | 5/1989 |
| JP | H01123616 A | 5/1989 |
| JP | 2010069371 A | 4/2010 |
| WO | 9832523 A1 | 7/1998 |
| WO | 9835323 A1 | 7/1998 |
| WO | 2010021053 A1 | 2/2010 |
| WO | 2011077224 A1 | 6/2011 |
| WO | 2011094153 A1 | 8/2011 |
| WO | 2012069827 A2 | 5/2012 |

OTHER PUBLICATIONS

PCT Application No. PCT/US2013/039545, International Search Report, dated Feb. 19, 2014, 3 pages.
PCT Application No. PCT/US2013/039545, Written Opinion of the International Searching Authority, dated Feb. 19, 2014, 5 pages.
PCT Application No. PCT/US2013/039545, International Preliminary Report on Patentability, dated Nov. 3, 2015, 6 pages.
GCC Patent Application No. GC2013-24382, Examination Report, dated Mar. 1, 2017, 4 pages.
Australia Patent Application No. 2013388102, Examination Report, dated Apr. 26, 2016, 3 pages.
Australia Patent Application No. 2013388102, Notice of Acceptance, dated Jul. 8, 2016, 2 pages.
Canada Patent Application No. 2,910,805, Office Action, dated Nov. 22, 2016, 4 pages.
Europe Patent Application No. 13883568.1, European Search Report, dated Nov. 21, 2016, 7 pages.
U.S. Appl. No. 13/887,069, Restriction Requirement, dated Nov. 14, 2014, 5 pages.
U.S. Appl. No. 13/887,069, Office Action, dated Feb. 13, 2015, 7 pages.
U.S. Appl. No. 13/887,069, Notice of Allowance, dated Jun. 10, 2015, 9 pages.
U.S. Appl. No. 13/887,069, Office Action, dated Sep. 18, 2015, 11 pages.
PCT Application No. PCT/U52013/039545, International Search Report, dated Feb. 19, 2014, 3 pages.
China Patent Application No. 201380076290.1, Office Action, dated Apr. 12, 2017, 21 pages.
China Patent Application No. 201380076290.1, Office Action, dated Aug. 23, 2016, 18 pages.

SYSTEMS AND METHODS FOR MULTI-CELLED GAS PROCESSING

CROSS-REFERENCE TO RELATED APPLICATIONS

This application is a divisional of and claims priority benefit under 35 U.S.C. § 121 to co-pending U.S. patent application Ser. No. 13/887,069, filed on May 3, 2013, and entitled "SYSTEMS AND METHODS FOR MULTI-CELLED GAS PROCESSING", which is hereby incorporated by reference for all purposes as if reproduced in its entirety.

FIELD OF THE INVENTION

The field of the invention is gas processing systems and methods.

BACKGROUND

The following background discussion includes information that may be useful in understanding the present invention. It is not an admission that any of the information provided herein is prior art or relevant to the presently claimed invention, or that any publication specifically or implicitly referenced is prior art.

In the field of carbon dioxide ($CO_2$) capture, particularly low-pressure, post-combustion $CO_2$ capture, large volumes of gas are typically processed. As rules and regulations restrict the amount of $CO_2$ that may be emitted from large, single-point emission sources, the volumes of gas that must be processed will become increasingly large. These large gas flows can require multiple trains of large-scale gas processing columns, which generally consume valuable plot space, represent significant capital cost, and increase the total equipment count of a plant.

With the rising prevalence of renewable energy (e.g., solar, wind, etc.), the ability to operate power and carbon capture plants at deep turndown capacity is important.

All extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Thus, there is still a need for improved gas processing systems and methods having reduced complexity while allowing for the ability to scale to meet capacity demand.

SUMMARY OF THE INVENTION

The inventive subject matter provides apparatus, systems and methods in which one can process gas more efficiently, and while reducing the construction materials and time required, equipment requirements, and plot space requirements.

Preferred systems include one or more gas processing columns, each of which has an outer housing. The column preferably combines, in a modular style, two or more cells disposed within the outer housing with each cell having a gas-liquid contacting area. It is especially preferred that the cells are fluidly coupled to one another, and share a common liquid space in a bottom portion. At least one of the cells can include a fluid outlet through which fluid from each of the cells can exit. This advantageously reduces the amount of equipment required to remove fluid from the cells.

Preferred systems are also modular such that additional columns can be quickly coupled to the existing gas processing column and thereby expand the maximum output of the system. In addition, the modular style of the system allows for flexibility in operation and during construction, and simplifies retrofits and plant expansions.

In addition, the inventive subject matter discussed herein allows for multiple gas processing columns to be combined into a single, modular unit. Such a unit permits a single train to be maintained when gas processing columns become too large (e.g., 800 MW units) by using multi-cell columns for gas treating.

This inventive subject matter discussed herein is especially applicable to carbon capture systems, but could be employed in any low-pressure absorption system including, for example, flue gas desulfurization and flue gas cooling.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Various objects, features, aspects and advantages of the inventive subject matter will become more apparent from the following detailed description of preferred embodiments, along with the accompanying drawing figures in which like numerals represent like components.

DETAILED DESCRIPTION

One should appreciate that the disclosed techniques provide many advantageous technical effects including reducing construction materials, equipment requirements, and plot space requirements, while allowing for flexibility in operation and during construction.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
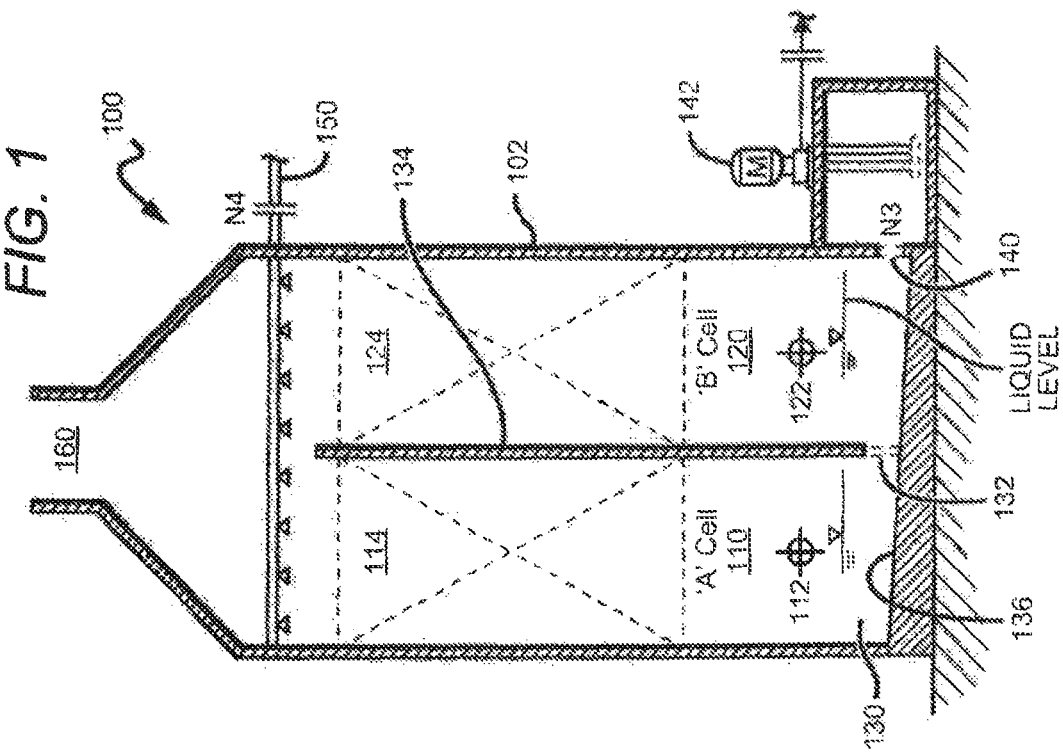
FIG. 1 is a schematic of one embodiment of a gas processing column having at least two cells.

In FIG. 1, a gas processing column 100 is shown having an outer housing 102. The column 100 preferably includes at least first and second cells 110 and 120 disposed within the outer housing 102. However, it is contemplated that the column 100 could optionally include three or more cells. Each of the first and second cells 110 and 120 preferably comprises a gas-liquid contacting surface area 114 and 124, respectively, such that each cell can clean or otherwise condition an incoming gas.

It is especially preferred that the first and second cells 110 and 120 are fluidly coupled to one another via a shared common liquid space 130 (e.g., liquid can flow between the cells). In this manner, liquid can be shared between the cells 110 and 120 such as through opening 132. As shown in FIG. 1, the first and second cells 110 and 120 are separated by a first wall 134 having opening 132 in a bottom portion of the first wall 134, such that liquid within each of the cells 110 and 120 can flow to the other cell via opening 132. Such a column 100 requires only a single train of pumps and piping leading to (e.g., liquid inlet 150) and from (e.g., fluid outlet 140 and pump 142) column 100, thereby optimizing plot area and reducing equipment count and cost. To encourage passive movement of liquid from cell 110 to cell 120, it is contemplated that one or both of cells 110 and 120 could include a downward-sloping floor 136.

It is contemplated that column 100 can be constructed out of steel or lined concrete, although any commercially suitable materials could be used. Where concrete is used, it is further contemplated that the concrete could be lined with plastic, tile or other impervious inert material.

A fluid outlet 140 can be coupled to the second cell 120, such that fluid from both of the first and second cells 110 and 120 can exit via the fluid outlet 140. This is advantageous as it reduces the complexity of conduits from the column 100 by eliminating the need to have separate outlet conduits for each cell, while also reducing the total number of pumps and other components required.

Preferably, fluid outlet 140 comprises at least one pump 142 to facilitate removal of liquid from the column 100. In some contemplated embodiments, pump 142 can be a vertical can pump to minimize the vessel skirt height and eliminates suction piping and valves.

The multi-celled column 100 typically will have as many gas inlets as cells. Thus, as shown in FIG. 1, each of first and second cells 110 and 120 includes a gas inlet 112 and 122, respectively.

Advantageously, column 100 minimizes plot space as compared with prior configurations of columns, while also offering operational flexibility because each of the cells can be independently operable, such that not all of the cells must be operated simultaneously. This allows for very low turn-down rates. For example, the multi-cell column 100 can be easily turned down by shutting down one or more of cells 110 and 120. In this matter, a carbon dioxide capture plant capacity can be changed to match varying power plant loads.

The cells 110 and 120 are preferably constructed in a modular style simplifying retrofitting or capacity increases by adding additional cells to the existing system. These additional cells can advantageously utilize the existing fluid inlets and outlets of the existing cells, reducing the need for additional equipment and plot space.

Column 100 can further include one or more exhaust outlets 160. As shown in FIG. 1, outlet 160 can be fluidly coupled to each of the first and second cells 110 and 120, although each of the cells could alternatively have its own outlet.

Figure 2:
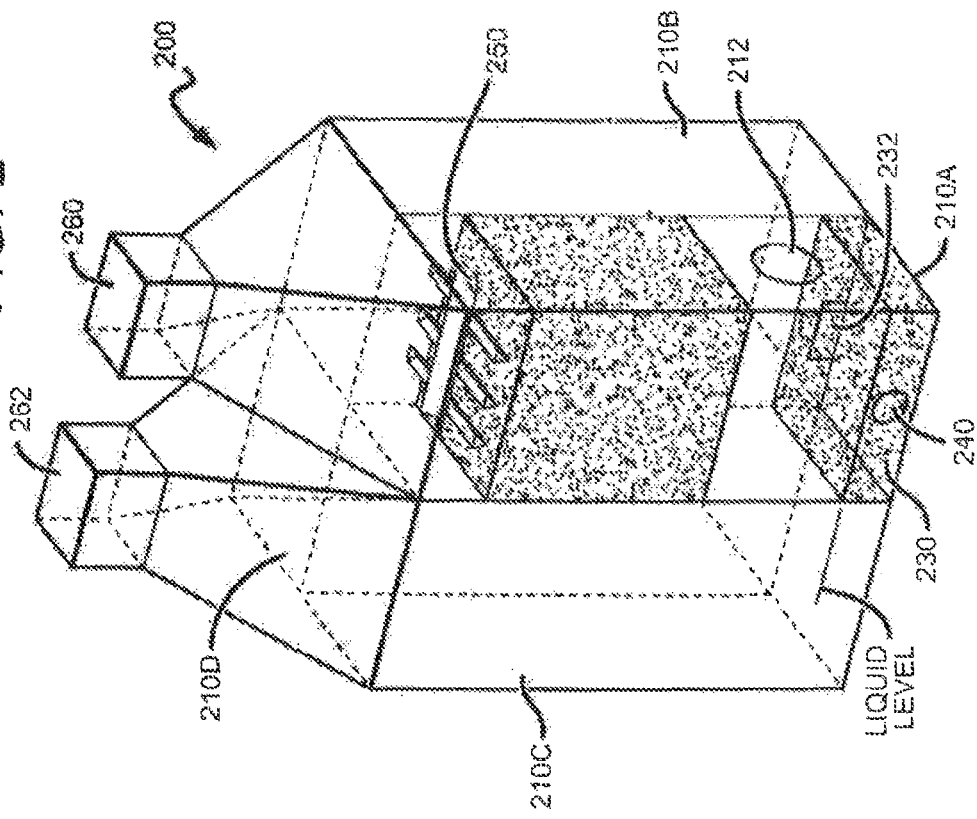
FIG. 2 is a schematic of another embodiment of a gas processing column having four cells.

FIG. 2 illustrates a gas processing system 200 having four cells 210A-210D arranged in a side-by-side cluster, although it is also contemplated that the cells could be arranged in-line. Although not shown, each of the cells 210A-210D can include a gas inlet 212. A common liquid space 230 can fluidly couple the cells 210A-210D to one another, as well as to fluid outlet 240. Cells 210A-210B could be fluidly coupled via opening 232 in the wall dividing cell 210A from cell 210B. The cell walls can include additional openings allowing for the cells 210A-210D to be fluidly coupled with one another.

Alternatively, it is contemplated that cells 210A-210B could be fluidly coupled to one another and to fluid outlet 240, and cells 210C-210D could be fluidly coupled to one another and to a second fluid outlet.

Cell 210A can include a liquid inlet, which feeds a fluid to distributors 250 disposed within cell 210A. It is further contemplated that the liquid inlet could also feed fluid to cells 210C, and potentially cells 210B and 210D, to reduce the number of liquid inlets required. In other contemplated embodiments, the cells could have two or more liquid inlets. For example, cells 210A and 210C could share fluid from a first liquid inlet, while cells 210B and 210D could share fluid from a second liquid inlet.

The cells 210A-210D could share one or more exhaust outlets. As shown in FIG. 2, cells 210A-210B could share a first exhaust outlet 260, while cells 210C-210D could share a second exhaust outlet 262. Alternatively, each of the cells could have its own exhaust outlet that may or may not feed to a common exhaust duct.

Figure 3A:
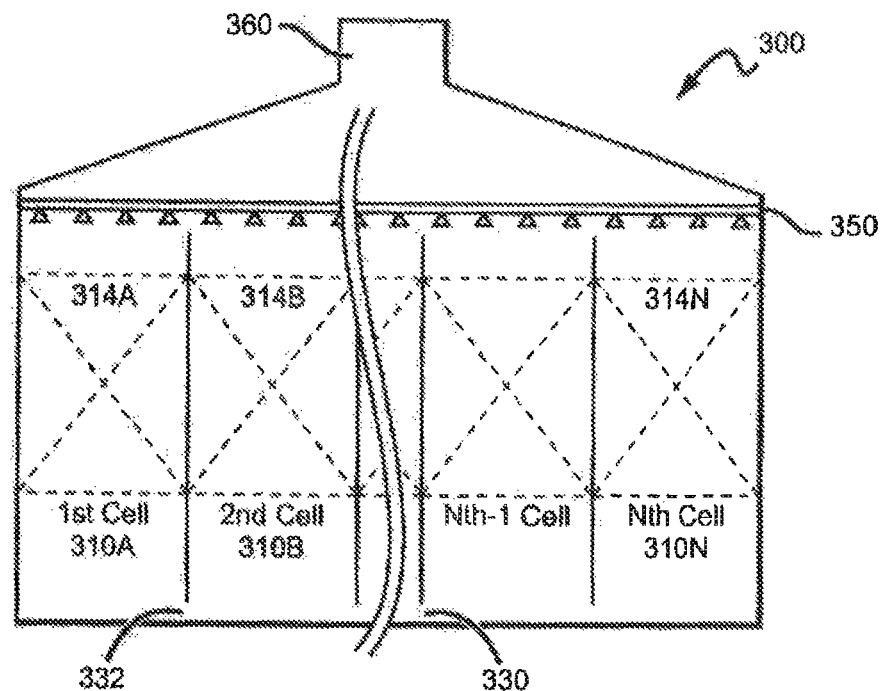
FIG. 3A is a schematic of another embodiment of a gas processing column having N cells.
Figure 3B:
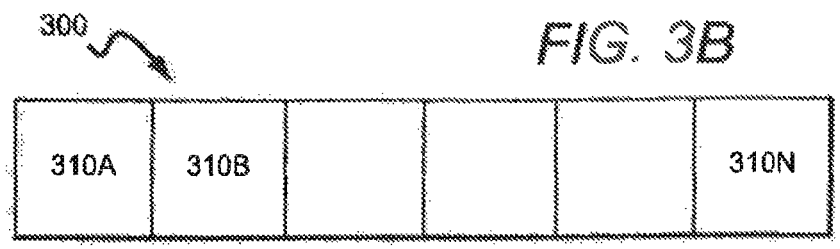
FIG. 3B is a plan view of the gas processing column of FIG. 3A.

FIGS. 3A-3B illustrate another embodiment of a gas processing system 300, having a plurality of cells 310A-310N disposed in an in-line fashion, although it is contemplated that some of the cells could be grouped, such as in a side-by-side cluster of columns having cells, for example. The system 300 could further include multiple columns, each of which comprises at least two cells that are fluidly coupled to each other.

As shown in FIG. 3A, the cells 310A-310N can be fluidly coupled via a common liquid space 330, and fluid is allowed to flow from one cell to an adjacent cell via openings 332 in a wall dividing adjacent cells. Alternatively, though less preferred, piping or other components could be used to move liquid from cell to cell.

Each of the cells 310A-310N has a gas-liquid contacting system 314A-314N, respectively, which could be used for, for example, carbon capture, direct contact cooling or other gas treating processes.

The cells 310A-310N can further include a shared liquid distributor 350 configured to distribute a liquid within at least a portion of each of the cells 310A-310N, as well as a shared exhaust conduit 360. However, it is contemplated that the cells 310A-310N could be separated into sets of one or more cells, each of which includes a separate liquid inlet/distributor and/or exhaust conduit.

Figure 4:
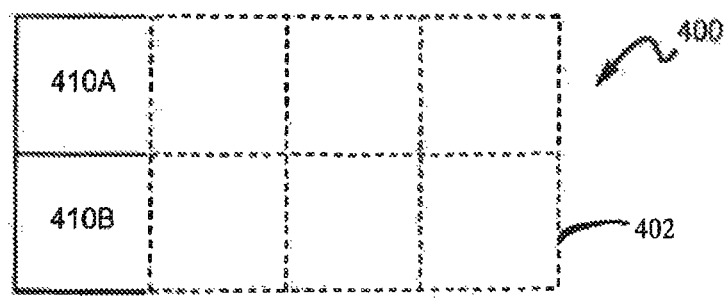
FIG. 4 is a plan view of a modular gas processing system capable of increasing capacity from two cells to eight cells.

FIG. 4 illustrates another embodiment of a gas processing system 400 having a column 402 that includes first and second cells 410A-410B. As shown in dashed lines, the system 400 can be constructed in a modular style, allowing for easy retrofits or increases of the system's capacity by increasing the number of cells or varying the number of cells in operation at a given time. The later-added cells can be fluidly coupled to the existing cells 410A-410B via a common liquid space, and thereby utilize the fluid outlet of the existing cells without requiring the need for additional equipment and much space outside of that shown in FIG. 4.

Figure 5:
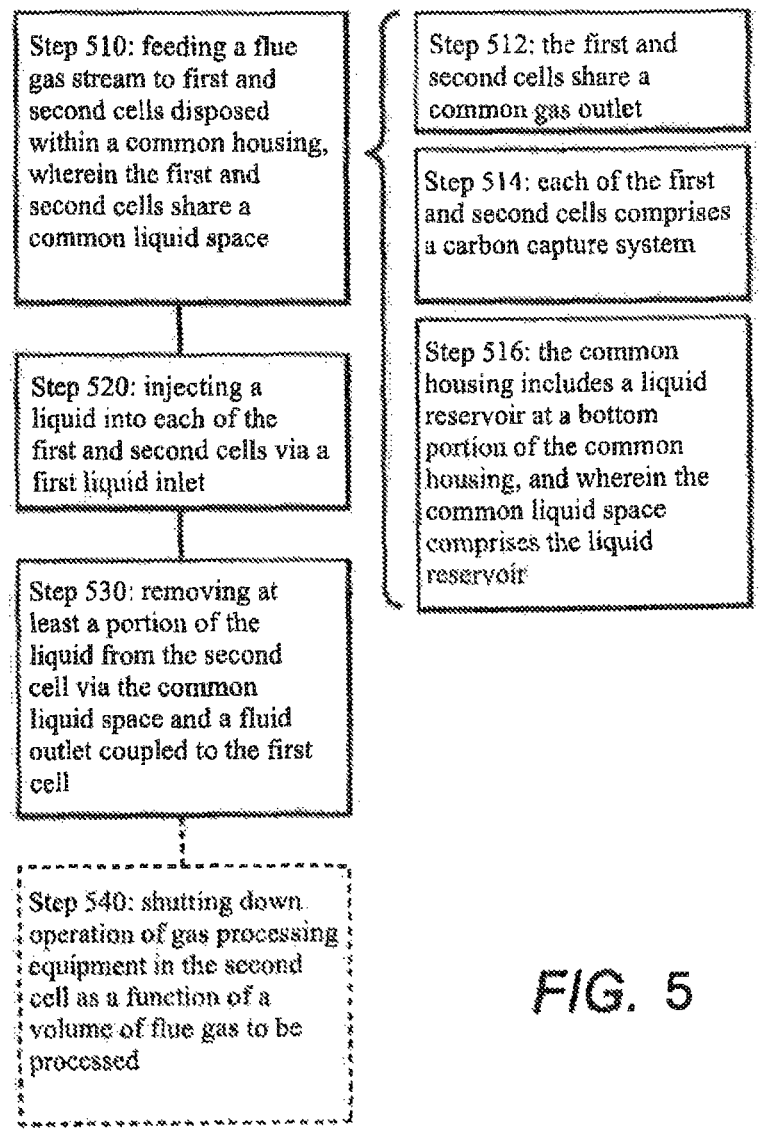
FIG. 5 is a flowchart of one embodiment of a method for gas processing.

FIG. 5 illustrates one embodiment of a method for processing gas. In step 510, a flue gas stream is fed to first and second cells that are disposed in a common housing and share a common liquid space. The housing could include three or more cells depending on the requirements of the system.

The first and second cells share a common gas outlet in step 512, and each of the first and second cells comprises a carbon capture system in step 514. It is further contemplated that one or both of the cells could include a direct contact cooler. In step 516, the common liquid space comprises a liquid reservoir disposed at a bottom portion of the common housing.

In step 520, a liquid is injected into each of the first and second cells via a shared first liquid inlet. At least a portion of the liquid can advantageously be removed from the second cell via the common liquid space and a fluid outlet coupled to the first cell in step 530. This eliminates the need for separate fluid outlets for each of the cells, reducing the overall footprint of the system.

Optionally, in step 540, operation of gas processing equipment in the second cell can be shut down as a function of a volume of flue gas to be processed. Thus, for example, the power requirements of the system can be reduced when there is a lower volume of gas to be processed and subsequently raised as the volume of flue gas increases.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. A method for gas processing, comprising:
feeding a flue gas stream to a first cell and a second cell, wherein the first cell and the second cell are disposed within a common housing, and wherein the first cell and the second cell share a common liquid space, wherein the common liquid space comprises a floor that slopes downward towards a fluid outlet coupled to each of the first cell and the second cell;
injecting a liquid into each of the first cell and the second cell via at least one liquid inlet; and
removing at least a portion of the liquid from the second cell via the common liquid space and a fluid outlet coupled to the first cell.

2. The method of claim 1, further comprising shutting down operation of gas processing equipment in the second cell as a function of a volume of flue gas to be processed.

3. The method of claim 1, wherein the first cell and the second cell share a common gas outlet.

4. The method of claim 1, wherein each of the first cell and the second cell comprises a carbon capture system.

5. The method of claim 1, wherein the common housing includes a liquid reservoir at a bottom portion of the common housing, and wherein the common liquid space comprises the liquid reservoir.

6. The method of claim 1, wherein the at least one liquid inlet comprises a single common liquid distributor.

7. The method of claim 1, wherein the at least one liquid inlet comprises a first liquid inlet and a second liquid inlet, wherein injecting the liquid into the first cell and the second cell comprises injecting a first portion of the liquid into the first cell through a first distributor, and wherein injecting the liquid into the first cell and the second cell comprises injecting a second portion of the liquid into the second cell through a second liquid distributor.

8. A method of gas processing, the method comprising:
feeding a gas stream to a plurality of cells, wherein the plurality of cells are all disposed within a common housing, wherein the plurality of cells share a common liquid space that is fluidly coupled to each of the plurality of cells and a liquid outlet, injecting a liquid into one or more of the plurality of cells;

contacting the gas stream with the liquid in one or more of the plurality of cells to produce a processed gas stream;

removing the liquid through the liquid outlet; and removing the processed gas stream through an exhaust outlet, wherein the common housing comprises a plurality of gas inlets coupled to each cell of the plurality of cells, wherein feeding the gas stream to the plurality of cells comprises feeding a portion of the gas stream through each gas inlet of the plurality of gas inlets to each cell of the plurality of cells.

9. The method of claim 8, wherein the exhaust outlet is in fluid communication with each of the plurality of cells.

10. The method of claim 8, wherein the exhaust outlet is only in fluid communication with a first cell of the plurality of cells.

11. The method of claim 8, wherein one or more of the plurality of cells comprise a gas-liquid contacting surface, and wherein the contacting of the gas stream with the liquid occurs, at least in part, over the gas-liquid contacting surface.

12. The method of claim 8, wherein at least a portion of the common liquid space comprises a floor that slopes downward towards the liquid outlet.

13. The method of claim 8, wherein removing the liquid through the liquid outlet comprises pumping the liquid from the liquid outlet.

14. The method of claim 8, wherein each cell of the plurality of cells comprises a fluid distributor, and wherein injecting the liquid into one or more of the plurality of cells comprises passing the liquid through the fluid distributor associated with the one or more of the plurality of cells.

15. The method of claim 8, wherein injecting the liquid into one or more of the plurality of cells comprises passing the liquid through a common fluid distributor associated with the plurality of cells.

16. The method of claim 8, wherein the common housing comprises one or more walls dividing adjacent cells of the plurality of cells.

17. The method of claim 16, wherein the one or more walls comprise openings in a bottom portion of the one or more walls, wherein the method further comprises: passing the liquid from the one or more of the plurality of cells through the openings in the one or more walls to the liquid outlet.

18. The method of claim 8, wherein the gas stream comprises a flue gas comprising carbon dioxide, and wherein the processed gas stream comprises the flue gas having a portion of the carbon dioxide removed therefrom.

19. A method of gas processing, the method comprising:

feeding a gas stream to a plurality of cells, wherein the plurality of cells are all disposed within a common housing, wherein the plurality of cells share a common liquid space that is fluidly coupled to each of the plurality of cells and a liquid outlet, injecting a liquid into one or more of the plurality of cells;

contacting the gas stream with the liquid in one or more of the plurality of cells to produce a processed gas stream;

removing the liquid through the liquid outlet; and removing the processed gas stream through an exhaust outlet, where at least one cell of the plurality of cells does not have any portion of the gas stream fed thereto.

20. The method of claim 8, wherein the common housing includes a liquid reservoir at a bottom portion of the common housing, and wherein the common liquid space comprises the liquid reservoir.

* * * * *